United States Patent
Liao

(10) Patent No.: US 10,859,856 B2
(45) Date of Patent: Dec. 8, 2020

(54) DISPLAY

(71) Applicant: AU OPTRONICS CORPORATION, Hsin-Chu (TW)

(72) Inventor: Ren-Wei Liao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 152 days.

(21) Appl. No.: 16/358,755

(22) Filed: Mar. 20, 2019

(65) Prior Publication Data

US 2019/0293965 A1 Sep. 26, 2019

(30) Foreign Application Priority Data

Mar. 20, 2018 (TW) .............................. 107109496 A

(51) Int. Cl.
*G02C 7/06* (2006.01)
*G02B 27/01* (2006.01)
*G02C 7/14* (2006.01)

(52) U.S. Cl.
CPC ........... *G02C 7/06* (2013.01); *G02B 27/0172* (2013.01); *G02B 27/0176* (2013.01); *G02C 7/14* (2013.01); *G02B 2027/0125* (2013.01)

(58) Field of Classification Search
CPC .......................... G02C 7/06; G02B 2027/0178
USPC ........................................................ 359/630
See application file for complete search history.

(56) References Cited

U.S. PATENT DOCUMENTS

| | | | |
|---|---|---|---|
| 7,391,574 B2 | 6/2008 | Fredriksson | |
| 2009/0295683 A1 | 12/2009 | Pugh et al. | |
| 2018/0005563 A1* | 1/2018 | Lee | ...................... G09G 3/2092 |

FOREIGN PATENT DOCUMENTS

| | | |
|---|---|---|
| CN | 101634750 A | 1/2010 |
| CN | 107561704 A | 1/2018 |
| CN | 107728319 A | 2/2018 |

OTHER PUBLICATIONS

Office Action issued by CNIPA dated Apr. 22, 2020 for the corresponding China application.

* cited by examiner

*Primary Examiner* — James C. Jones
(74) *Attorney, Agent, or Firm* — WPAT, PC

(57) ABSTRACT

The present invention provides a display, including a first display device, a second display device, a half mirror and a bifocal lens. The first display device provides a first image light, and the second display device provides a second image light. The half mirror has a first surface and a second surface opposite to each other, and is spaced apart from the first display device and the second display device by a first distance and a second distance respectively, where the first distance is not equal to the second distance. The first image light is emitted to the first surface, and the second image light is emitted to the second surface. The bifocal lens is spaced apart from the half mirror by a third distance and faces the first surface. The bifocal lens has a first focal length and a second focal length different from each other. The first focal length is greater than a sum of the first distance and the third distance, and the second focal length is greater than a sum of the second distance and the third distance.

12 Claims, 9 Drawing Sheets

DISPLAY

BACKGROUND

Technical Field

The present invention relates to a display, and in particular, to a near eye display.

Related Art

A near eye display is the display that is directly worn by a user on the head or that is mounted on a head-mounted apparatus such as a helmet, glasses, or a safety helmet. Usually, a display disposed in front of eyes of the user is mounted inside a head-mounted display, so that the user sees images displayed by the display at an imaging distance. The technology may be applied to virtual reality, assisting in performing a medical operation, visual aid during flight of a pilot, or/and the like.

During actual application, and particularly in a category of the virtual reality, a field of view (FOV) of the head-mounted display is usually designed to be approximately 100 degrees, to increase a sense of immersion of the user. Even if using the head-mounted display, the user feels realness of seen scenery. However, when a single display panel was used in the display, a larger FOV indicates a larger angle corresponding to a single pixel, that is, lower angle resolution. In this case, a screen door effect is often generated. The user sees boundaries between pixels, and watching quality is affected.

In conclusion, the head-mounted display in the existing technology is limited in design. In other words, to increase the sense of immersion of the user, quality of the image needs to be sacrificed. Therefore, the head-mounted display in the existing technology still has spaces for improvement.

SUMMARY

A technical problem to be resolved by the present invention is to provide a display for a deficiency in the prior art. The display can provide two images for a user. An FOV of one of the images is smaller, to provide clear image quality. An FOV of the other image is larger, to provide a wider image area.

To achieve the foregoing objective, one of technical solutions used in the present invention is to provide a display, including a first display device, a second display device, a half mirror, and a bifocal lens. The first display device provides a first image light, and the second display device provides a second image light. The half mirror has a first surface and a second surface opposite to each other, and is spaced apart from the first display device and the second display device by a first distance and a second distance respectively, where the first distance is not equal to the second distance. The first image light is emitted to the first surface, and the second image light is emitted to the second surface. The bifocal lens faces the first surface and is spaced apart from the first surface by a third distance. The bifocal lens has a first focal length and a second focal length different from each other. The first focal length is greater than a sum of the first distance and the third distance, and the second focal length is greater than a sum of the second distance and the third distance. The first image light reaches the bifocal lens after being reflected on the first surface, and generates first magnification imaging according to the first focal length. The second image light reaches the bifocal lens after passing through the second surface, and generates second magnification imaging according to the second focal length. A range of the first magnification imaging is not equal to a range of the second magnification imaging.

By using the foregoing technical means, one of effects that the present invention can achieve lies in that, according to the display provided in the present invention, the technical solutions, namely, "the half mirror has a first surface and a second surface opposite to each other, and is spaced apart from the first display device and the second display device by a first distance and a second distance respectively, where the first distance is not equal to the second distance, the first image light is emitted to the first surface, and the second image light is emitted to the second surface" and "the bifocal lens faces the first surface and is spaced apart from the first surface by a third distance, where the bifocal lens has a first focal length and a second focal length different from each other, the first focal length is greater than a sum of the first distance and the third distance, and the second focal length is greater than a sum of the second distance and the third distance" are used, so that "the first image light reaches the bifocal lens after being reflected on the first surface, and generates first magnification imaging according to the first focal length; the second image light reaches the bifocal lens after passing through the second surface, and generates second magnification imaging according to the second focal length; and the range of the first magnification imaging is not equal to the range of the second magnification imaging".

To further learn features and technical contents of the present invention, please refer to the following detailed descriptions and drawings related to the present invention. However, the provided drawings are merely used to provide reference and descriptions, and are not used to limit the present invention.

DETAILED DESCRIPTION

Figure 1:
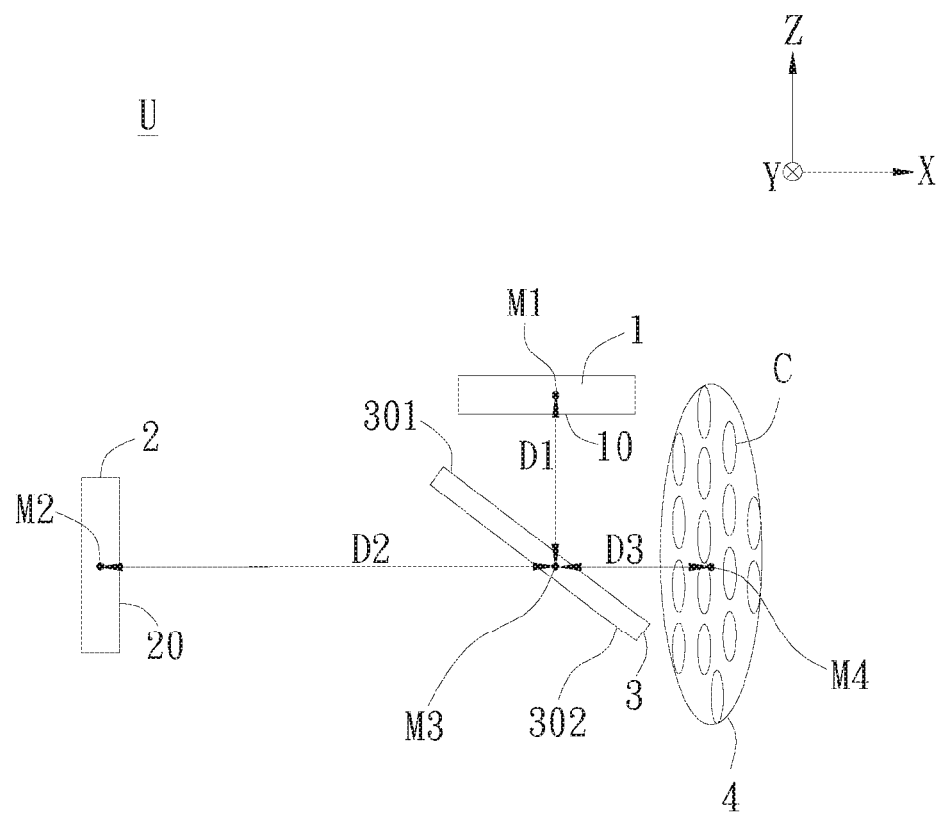
FIG. 1 is a schematic side view of the display according to Embodiment 1 of the present invention.

In the attachment drawings, for clarity, the thickness of layers, membranes, panels, areas, and the like were enlarged. In the whole specification, the same referential sign indicates the same element. It should be understood that when an element such as a layer, a membrane, an area, or a substrate is expressed as "on another element" or "connected to another element", the element may be directly on another element or connected to another element, or there may be an intermediate element. On the contrary, when an element is expressed as "directly on another element" or "directly connected to" another element, there is no intermediate element. As used herein, "connection" may refer to physical and/or electric connection. In addition, for "electric connection" or "coupling", there may be another element between the two elements.

The terms "about", "approximately", or "essentially" used herein include the value and an average of values within the acceptable offset range of the specific value determined by those who have ordinary skills in the art, in consideration of the specific quantity of errors of measurement and measurement-related errors discussed (that is, limitation of a measuring system). For example, "about" may indicate being within one or multiple standard offsets of the value, or within ±30%, ±20%, ±10%, or ±5%. Further, for the terms "about", "approximately", or "essentially" used herein, the relatively acceptable offset range or the standard offset may be selected based on optical properties, etching properties, or other properties, instead of that one standard offset is used for all properties.

Unless otherwise defined, all the terms used in herein (including technical and scientific terms) have the same meanings as generally understood by those who have ordinary skills in the art. It should be further understood that terms such as those defined in usually used dictionaries should be interpreted to have the same meanings as the terms in the related art and the contexts of the present invention, and should not be interpreted to have ideal or excessively formal meanings unless explicitly defined herein.

The following describes, by using specific embodiments and with reference to FIG. 1 to FIG. 9, implementations of the display disclosed in the present invention. Those who are skilled in the art can understand advantages and effects of the present invention according to contents disclosed in the specification. However, the following disclosed contents are not used to limit the protection scope of the present invention. Those who are skilled in the art can implement the present invention by using other different embodiments based on different opinions and applications without departing from the conception and spirit of the present invention. In addition, it should be first noted that the accompany drawings of the present invention are merely for illustration and description, and are not drawn according to the actual size. In addition, although in the specification, terms such as first, second and third may be used to describe various elements, the elements should not be limited to the terms. The terms are mainly used to differentiate the elements.

Embodiment 1

Referring to FIG. 1, Embodiment 1 of the present invention provides a display U. The display U includes a first display device 1, a second display device 2, a half mirror 3, and a bifocal lens 4. The first display device 1 provides a first image light L1, and the second display device 2 provides a second image light L2. The first display device 1 and the second display device 2 may be liquid crystal displays, organic light emitting diode displays, inorganic light emitting displays, other suitable types of displays, or combinations of the foregoing types of displays. The half mirror 3 has a first surface 301 and a second surface 302 opposite to each other, and is spaced apart from the first display device 1 and the second display device 2 by a first distance D1 and a second distance D2 respectively, where the first distance D1 is not equal to the second distance D2. The first image light L1 is emitted to the first surface 301, and the second image light L2 is emitted to the second surface 302.

The half mirror 3 may be a spectroscope that enables light to be partially reflected and partially transmitted. In this embodiment, for the half mirror 3, light may pass through the first surface 301 to be entered, and light may pass through the second surface 302 to be entered, both of which have the foregoing light splitting effect. In this embodiment, the crossing point at which the line connecting the central point M4 of the bifocal lens 4 to the central point M2 of the display image of the second display device 2 intersects the half mirror 3 is defined as the reference point M3. The first distance D1 is defined as the distance between the reference point M3 and the central point M1 of the first display device 1. The second distance D2 is defined as the distance between the reference point M3 and the central point M2 of the display image of the second display device 2. The third distance D3 is defined as the distance between the reference point M3 and the central point M4 of the bifocal lens 4.

Figure 2:
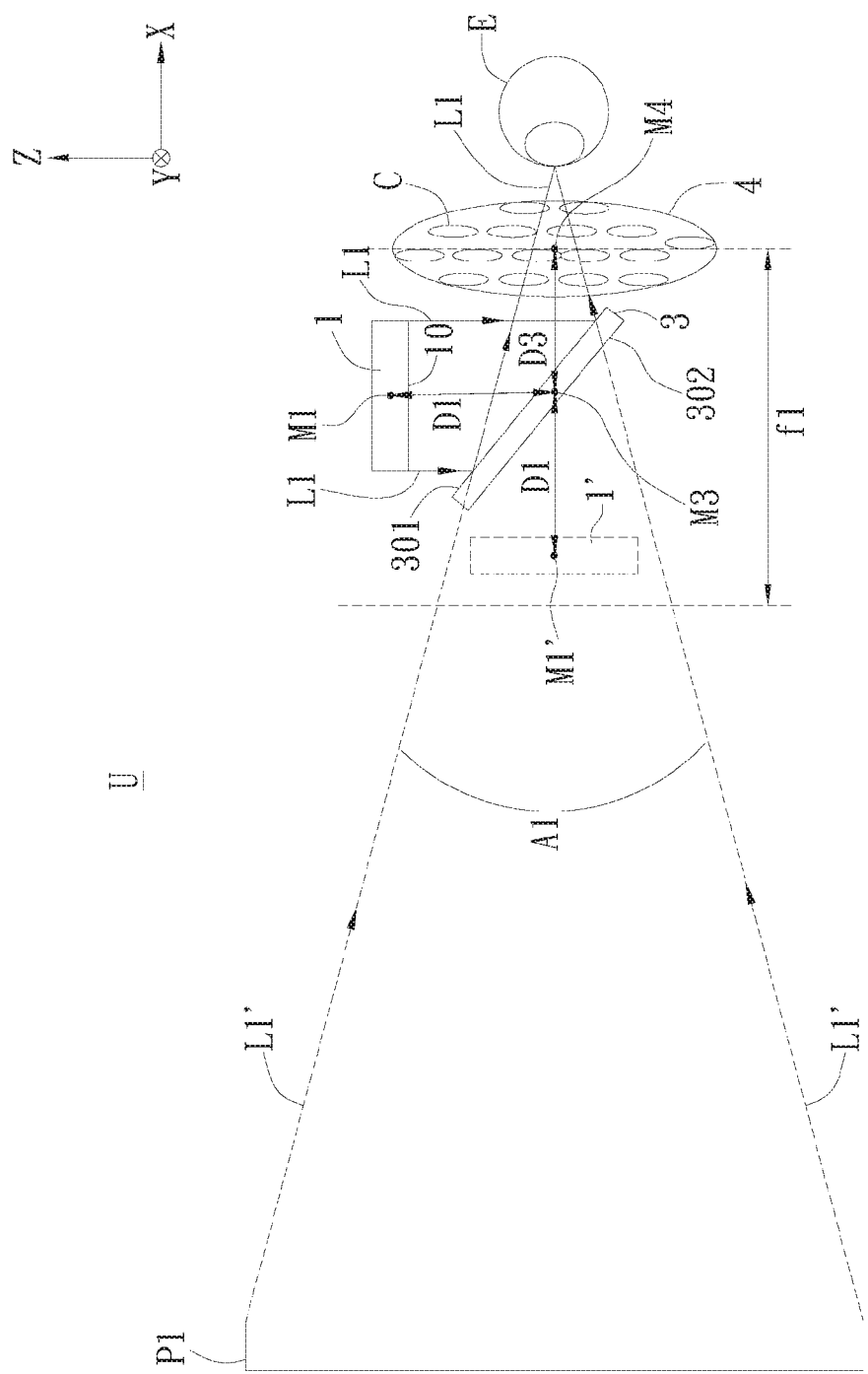
FIG. 2 is a schematic diagram of the visual path generated by the user after first image light generated by the first display device is processed by a half mirror and a bifocal lens according to Embodiment 1 of the present invention.

Referring to FIG. 2, in this embodiment, the first image light L1 generated by the first display device 1 is to be reflected by the first surface 301 of the half mirror 3 and enter eyes E of a user by passing through the bifocal lens 4. Eyes consider that light substantially travels along a straight line and an object distance is approximately equal to an image distance according to the principle of plane mirror imaging. Therefore, for the eyes E of the user shown in the drawing, an equivalent first display device 1' which is equivalent to a mirror image of the first display device 1 exists behind the half mirror 3. Because the equivalent first display device 1' is the mirror image of the first display device 1, the equivalent first display device 1' has the central point M1' relative to the central point M1 of the first display device 1, and the distance between the central point M1' and the reference point M3 is approximately equal to the first distance D1. When the first image light L1 is reflected by the first surface 301 of the half mirror 3 and is refracted by the bifocal lens 4, first magnification imaging P1 formed by the first image light L1 is equivalent to virtual magnification imaging formed by the light emitted from a position of the equivalent first display device 1' on the same side after processing by the bifocal lens 4. The first FOV A1 is the FOV of watching the first magnification imaging P1 by the eyes E of the user in FIG. 2.

A surface of the bifocal lens 4 that is adjacent to the first surface 301 opposite to (or referred to as facing) the first surface 301. The bifocal lens 4 has a first focal length f1 and a second focal length f2 different from each other, the first focal length f1 is greater than the sum of the first distance D1 and the third distance D3, and the second focal length f2 is greater than the sum of the second distance D2 and the third distance D3. In this embodiment, the central point M4 of the bifocal lens 4, the reference point M3 of the half mirror 3, the central point M1' of the equivalent first display device F, and the central point M2 of the second display device 2 are collinear. In this way, the display U can provide a relatively good visual effect. However, the present invention is not limited thereto.

Referring to FIG. 2, the first image light L1 reaches the bifocal lens 4 after being reflected on the first surface 301, and generates a first magnification imaging P1 according to the first focal length f1. Light L1' indicated by a dashed line is a visual light path seen by the eyes E of the user. Because the human eyes consider that light travels along a straight line, the first image light L1 is visually extended, and the human eyes consider that the light enter the eyes E from the first magnification imaging P1 by passing through the path of virtual first image light L1'.

Figure 3:
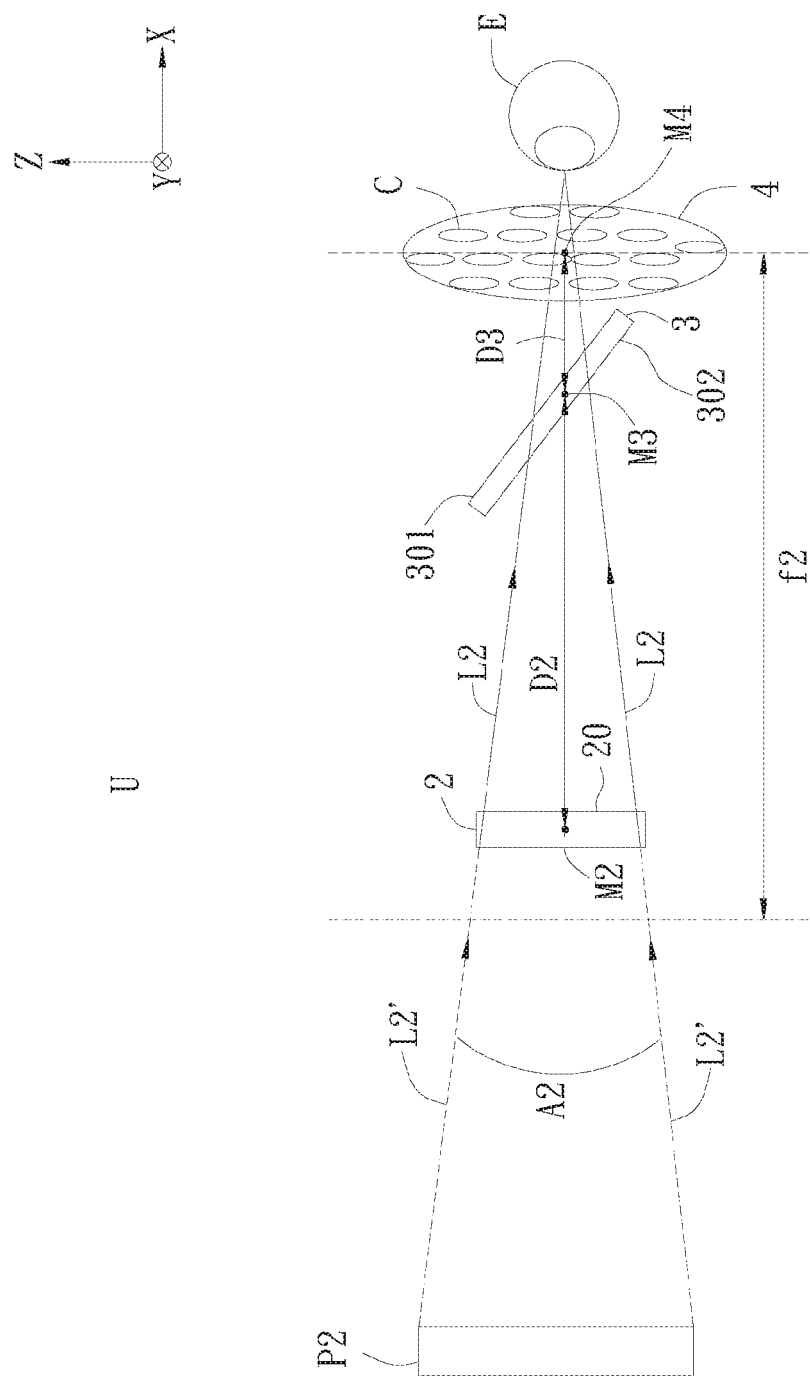
FIG. 3 is a schematic diagram of the visual path generated by the user after second image light generated by the second display device is processed by the half mirror and the bifocal lens according to Embodiment 1 of the present invention.

Referring to FIG. 3, the second image light L2 passes through the second surface 302 and reaches the bifocal lens 4, and generates a second magnification imaging P2 according to the second focal length f2. Light L2' indicated by a dashed line is the visual light path seen by the eyes E of the user. Because the human eyes consider that light substantially travels along a straight line, the second image light L2 is visually extended, and the human eyes consider that the light enter the eyes E from the second magnification imaging P2 by passing through the path of virtual second image light L2'. A second FOV A2 is the FOV of watching the second magnification imaging P2 by the eyes E of the user in FIG. 3.

Further, in this embodiment, the first image light L1 has a first polarization direction, the second image light L2 has a second polarization direction, the first polarization direction is not equal to the second polarization direction, and the bifocal lens 4 has different refractive indexes relative to light in the first polarization direction and light in the second polarization direction. The bifocal lens 4 has the first focal length f1 relative to a refractive index in the first polarization direction, and the bifocal lens 4 has the second focal length f2 relative to a refractive index in the second polarization direction.

Figure 4:
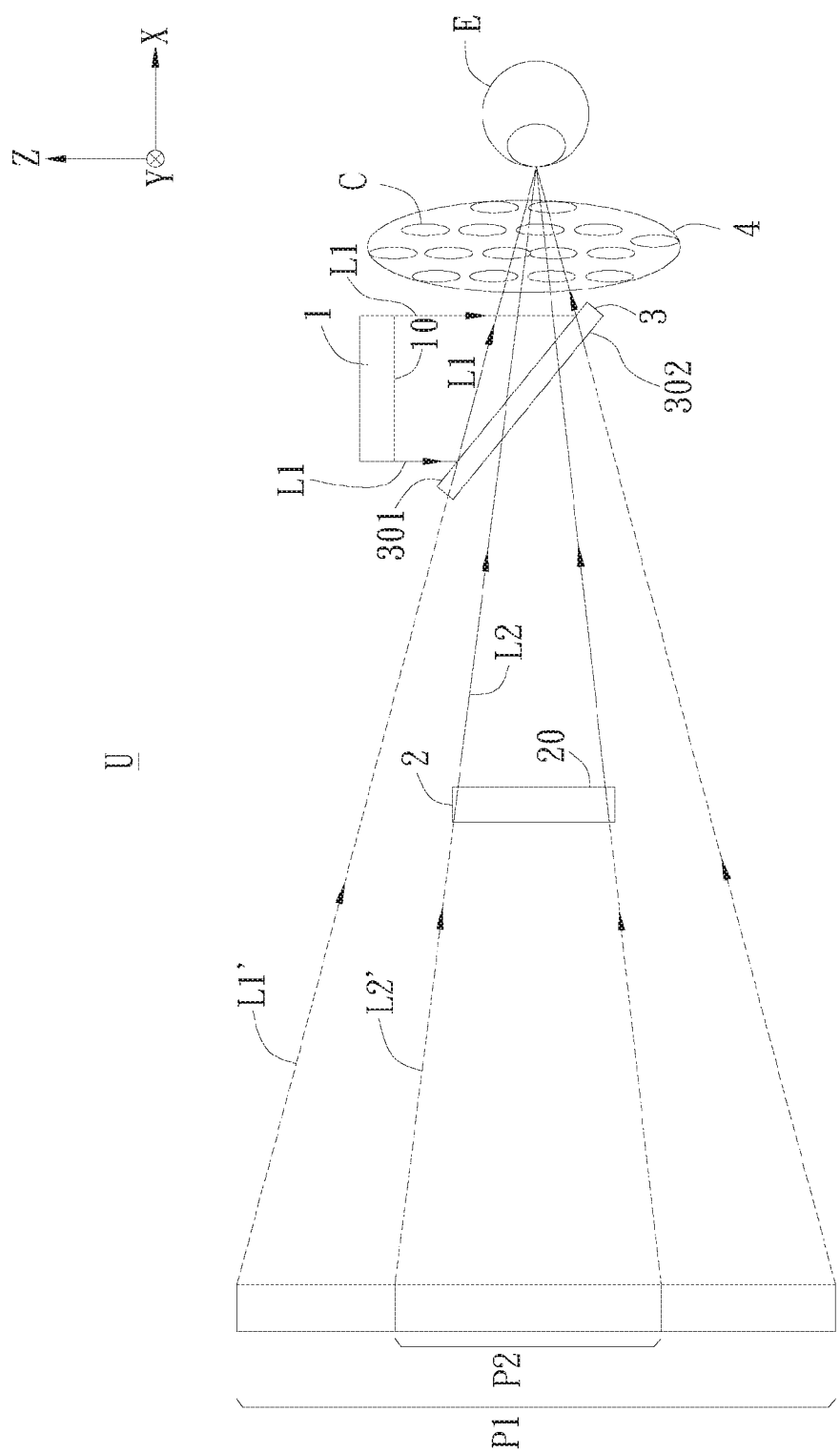
FIG. 4 is a schematic diagram of visual paths generated by the user after the first image light and the second image light respectively generated by the first display device and the second display device are processed by the half mirror and the bifocal lens according to Embodiment 1 of the present invention.

FIG. 4 is a schematic diagram showing that the first display device 1 and the second display device 2 of the display U in Embodiment 1 of the present invention are simultaneously operated. The first image light L1 and the second image light L2 respectively generated by the first display device 1 and the second display device 2 generate the first magnification imaging P1 and the second magnification imaging P2 in the eyes of the user after being processed by the half mirror 3 and the bifocal lens 4. As shown in the drawing, the first magnification imaging P1 and the second magnification imaging P2 are imaged in the same plane. However, the present invention is not limited thereto. The range of the first magnification imaging P1 is not equal to the range of the second magnification imaging P2. To be more specific, because the first image light L1 generates the first magnification imaging P1 corresponding to the first focal length f1, the second image light L2 generates the second magnification imaging P2 corresponding to the second focal length f2, and in this embodiment, the first focal length f1 is less than the second focal length f2. Therefore, the first magnification imaging P1 is greater than the second magnification imaging P2.

The lens having dual focal lengths is used in the present invention, so that the display U can present, in a same imaging plane, two groups of images having different magnifications and having different FOVs for the user. To be specific, because when human eyes watch scenery, a FOV can reach approximately 120 degrees, but an FOV within which the scenery can be clearly identified is only approximately 60 degrees, eyes can see only fuzzy images if the scenery is beyond the angle range. To ensure both image quality and the large FOV, technical solution provided in this embodiment of the present invention makes the second image light L2 correspond to the larger second focal length f2 and display the second magnification imaging P2 having the smaller second FOV A2. Therefore, within the range within which scenery can be clearly identified by the user, the user can be provided with an image with higher angle resolution. In addition, the first image light L1 corresponds to the smaller first focal length f1, to provide the larger first FOV A1, the first magnification imaging P1 with lower resolution within a range of visibility around the user, and provide the user with a wider image background area, so that the user has a better sense of immersion when watching the image, and experience of the user can be improved.

In this embodiment, the bifocal lens 4 is implemented by using the liquid crystal lens that includes a plurality of liquid crystal molecules C, the major axis of the liquid crystal molecules C corresponds to the first polarization direction, and a minor axis of the liquid crystal molecules C corresponds to the second polarization direction. However, the present invention is not limited thereto.

For example, in this embodiment, the major axis of the liquid crystal molecules C is substantially parallel to a Z-axis, and the minor axis may be any axis that passes through the center of the liquid crystal molecules C in the X-Y plane. The minor axis in this embodiment is defined as the axis substantially parallel to the Y-axis and passing through the center of the liquid crystal molecules C. In addition, a display surface 10 of the first display device 1 is substantially perpendicular to the display surface 20 of the second display device 2. The half mirror 3 is separately inclined by approximately 45 degrees relative to the display surface 10 of the first display device 1 and the display surface 20 of the second display device 2. However, the present invention is not limited thereto. In other embodiments, the angle between the display surface 10 of the first display device 1 and the display surface 20 of the second display device 2 and the angle of the half mirror 3 relative to the both may be adjusted according to a requirement.

By using the foregoing structural feature, according to the present invention, the first image light L1 and the second image light L2 travel toward the bifocal lens 4 approximately along the X-axis respectively in the first polarization direction and the second polarization direction after being reflected on the first surface 301 of the half mirror 3 and passing through the second surface 302 separately. The first polarization direction is perpendicular to the second polarization direction, and the first polarization direction is substantially parallel to the major axis direction of the liquid crystal molecules C in the bifocal lens 4, that is, the Z-axis direction, and the second polarization direction is substantially parallel to the minor axis direction of the liquid crystal molecules C, that is, is substantially parallel to the Y-axis direction.

In this way, the refraction behavior after the first image light L1 enter the bifocal lens 4 corresponds to the extraordinary refractive index $n_e$ of the bifocal lens 4, and the refraction behavior after the second image light L2 enter the bifocal lens 4 corresponds to the ordinary refractive index $n_o$ of the bifocal lens 4. It should be noted that the liquid crystal is the single optical axis medium. The single optical axis medium may be divided the positive single optical axis medium and the negative single optical axis medium. The extraordinary refractive index $n_e$ of the positive single optical axis liquid crystal is greater than the ordinary refractive index $n_o$, and the extraordinary refractive index $n_e$ of the negative single optical axis liquid crystal is less than the ordinary refractive index $n_o$. In this embodiment the liquid crystal molecules C are positive single optical axis liquid crystals. However, the present invention is not limited thereto.

In other words, the refraction behavior of the first image light L1 having the first polarization direction after the first image light L1 enters the bifocal lens 4 will be affected by the extraordinary refractive index $n_e$, and further the bifocal lens 4 has the first focal length f1 and the first image light L1 generates the first magnification imaging P1 according to the refractive index $n_e$; and the refraction behavior after the second image light L2 having the second polarization direction enters the bifocal lens 4 will be affected by the ordinary refractive index $n_o$, and further the bifocal lens 4 has the second focal length f2 and the second image light L2 generates the second magnification imaging P2 according to the refractive index $n_o$. The positive single optical axis medium is used as an example of the liquid crystal molecule C in this embodiment, and the extraordinary refractive index $n_e$ of the positive single optical axis medium is greater than the ordinary refractive index $n_o$. Therefore, the first focal length f1 is less than the second focal length f2, and the first magnification imaging P1 is greater than the second magnification imaging P2.

Figure 5C:
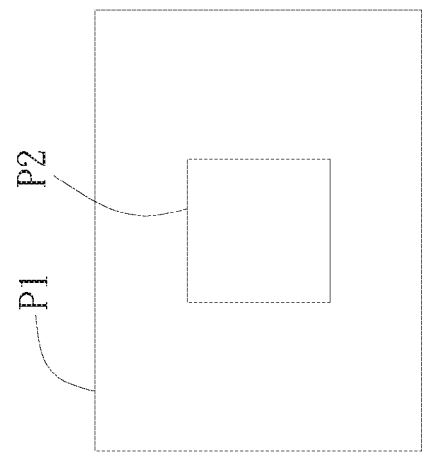
FIG. 5C is a schematic front view when the first magnification imaging overlaps the second magnification imaging according to Embodiment 1 of the present invention.
Figure 5B:
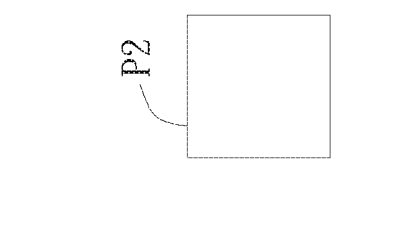
FIG. 5B is a schematic front view of the second magnification imaging according to Embodiment 1 of the present invention.
Figure 5A:
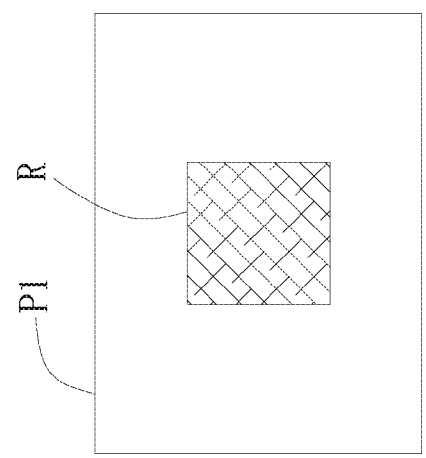
FIG. 5A is a schematic front view of the first magnification imaging according to Embodiment 1 of the present invention.
Figure 6C:
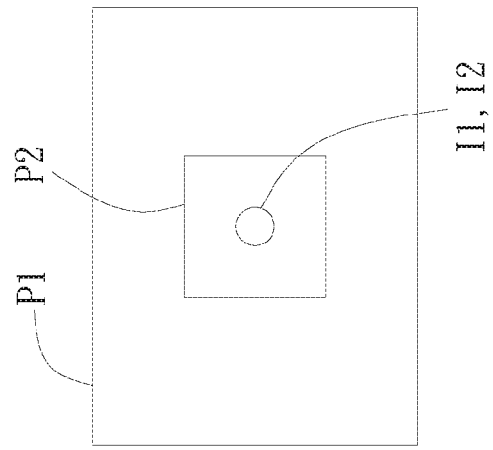
FIG. 6C is a schematic front view when the first magnification imaging overlaps the second magnification imaging according to another embodiment of the present invention.
Figure 6B:
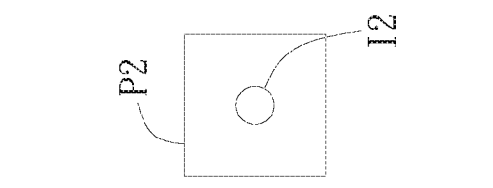
FIG. 6B is a schematic front view of the second magnification imaging according to another embodiment of the present invention.
Figure 6A:
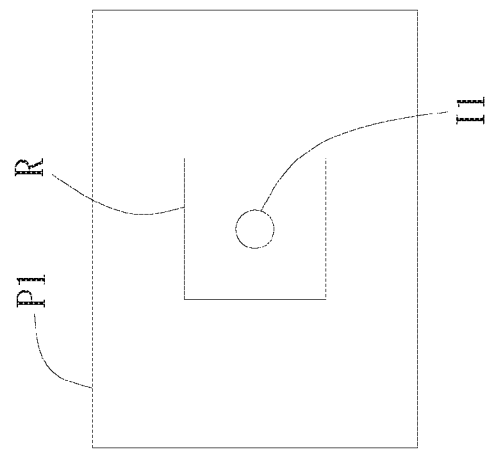
FIG. 6A is a schematic front view of the first magnification imaging according to another embodiment of the present invention.
Figure 7C:
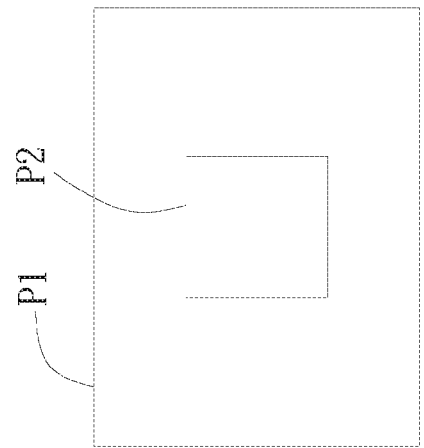
FIG. 7C is a schematic front view when the first magnification imaging overlaps the second magnification imaging according to the still another embodiment of the present invention.
Figure 7B:
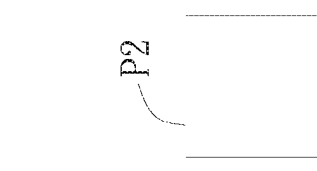
FIG. 7B is a schematic front view of the second magnification imaging according to the still another embodiment of the present invention.
Figure 7A:
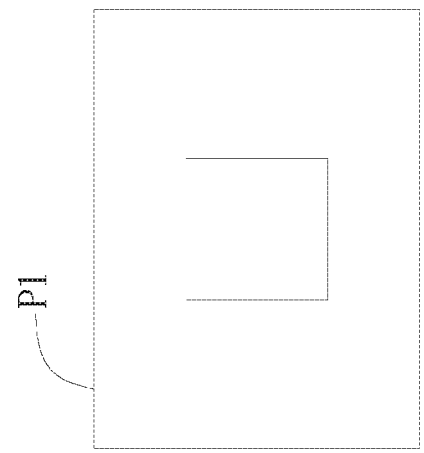
FIG. 7A is a schematic front view of the first magnification imaging according to still another embodiment of the present invention.

FIG. 5A to FIG. 5C are respectively a schematic front view of first magnification imaging, a schematic front view of second magnification imaging, and a schematic front view when the first magnification imaging overlaps the second magnification imaging according to this embodiment. The range of the first magnification imaging P1 in this embodiment is greater than that of the second magnification imaging P2 and covers the second magnification imaging P2. In this embodiment, the first display device 1 is designed to display an overlapped region R of the first magnification imaging P1 and the second magnification imaging P2 black. That is, the display U just displays the second magnification imaging P2 in the overlapped region R in which the first magnification imaging P1 overlaps the second magnification imaging P2. However, the present invention is not limited thereto. In other embodiments, as shown in FIG. 6A to FIG. 6C, the first magnification imaging P1 may display the image which is same as that the second magnification imaging P2 does within the overlapped range of the first magnification imaging P1 and the second magnification imaging P2. For example, the first magnification imaging P1 displays the object image I1 within the overlapped region R of the first magnification imaging P1 and the second magnification imaging P2, the second magnification imaging P2 displays the object image I2 which is similar to the object image I1 at the position corresponding to the object image I1, and when the first magnification imaging P1 overlaps the second magnification imaging P2, display positions of the object image I1 and the object image I2 overlap. Alternatively, in another embodiment, as shown in FIG. 7A to FIG. 7C, the range of the first magnification imaging P1 may surround the second magnification imaging P2. To be specific, the first magnification imaging P1 formed by the first display device 1 just provides the peripheral image, and the second display device 2 is responsible for providing the central and clearer second magnification imaging P2.

It should be noted that in this embodiment, the first distance D1 is less than the second distance D2. However, the present invention is not limited thereto. In other embodiments, the first distance D1 in the other embodiments may alternatively be greater than the second distance D2 provided that the following conditions are satisfied: The first polarization direction of the first image light L1 is substantially parallel to the major axis direction of the liquid crystal molecules, the second polarization direction of the second image light L2 is substantially parallel to the minor axis direction of the liquid crystal molecules, and in cooperation with a choice of the liquid crystal molecules, the first focal length corresponding to the extraordinary refractive index of the liquid crystal molecules is greater than the sum of the first distance and the third distance, and the second focal length corresponding to the ordinary refractive index of the liquid crystal molecules is greater than the sum of the second distance and the third distance.

In addition, in this embodiment, the first focal length f1 is less than the second focal length f2. However, the present invention is not limited thereto. In other embodiments, when the liquid crystal molecules C are the positive single optical axis media, the first polarization direction of the first image light L1 generated by the first display device 1 may be substantially parallel to the minor axis direction of the liquid crystal molecules C, and the second polarization direction of the second image light L2 generated by the second display device 2 may be substantially parallel to the major axis direction of the liquid crystal molecules C. In this way, the first focal length f1 will be greater than the second focal length f2. In this case, the first magnification imaging P1 will be less than the second magnification imaging P2, and display manners of the display U may also have implementations such as one of imaging ranges covering the other imaging range, only one having the smaller imaging range displaying the image in the overlapped region, and one of the imaging ranges surrounding the other imaging range. The display manners are not limited to this embodiment.

Embodiment 2

Figure 8:
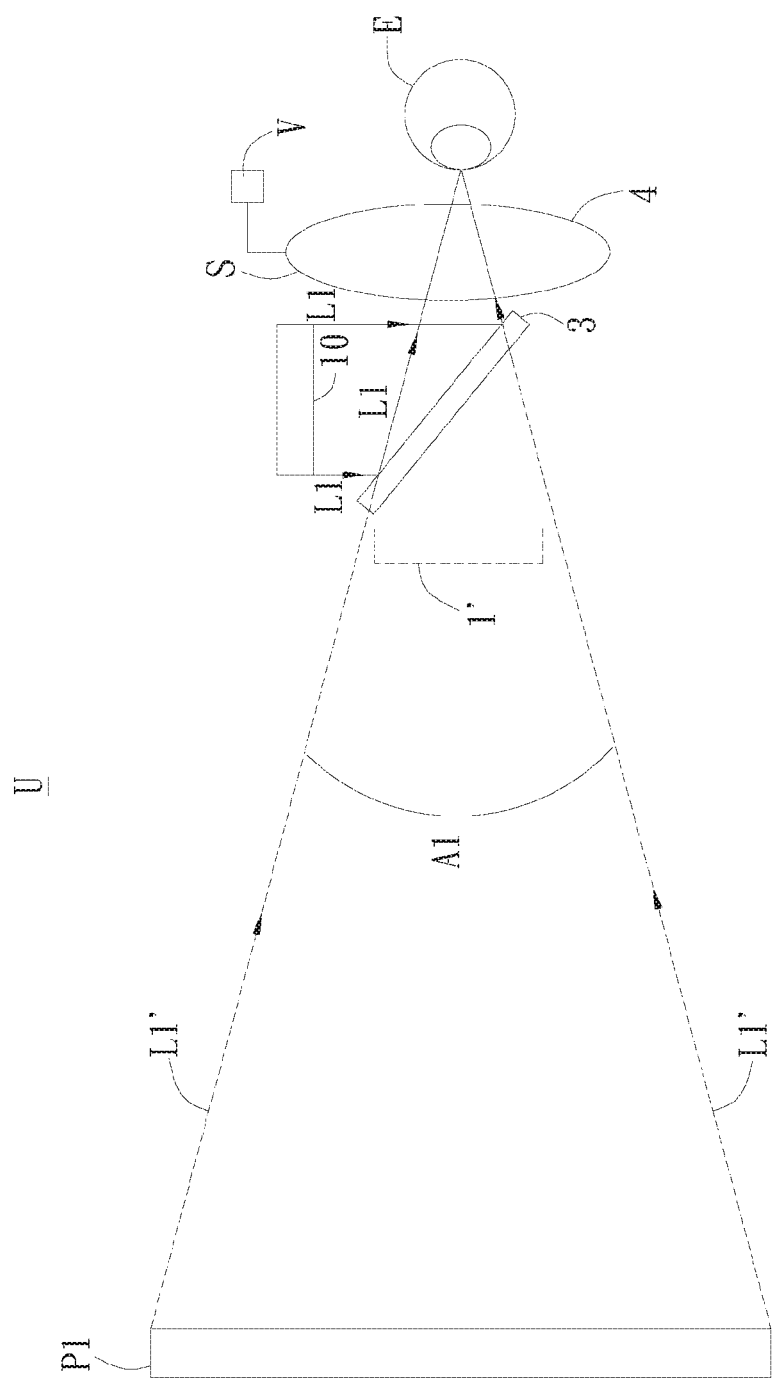
FIG. 8 is a schematic diagram of a visual path generated by the user after the first image light generated by the first display device is processed by a bifocal lens at the first time sequence according to Embodiment 2 of the present invention.
Figure 9:
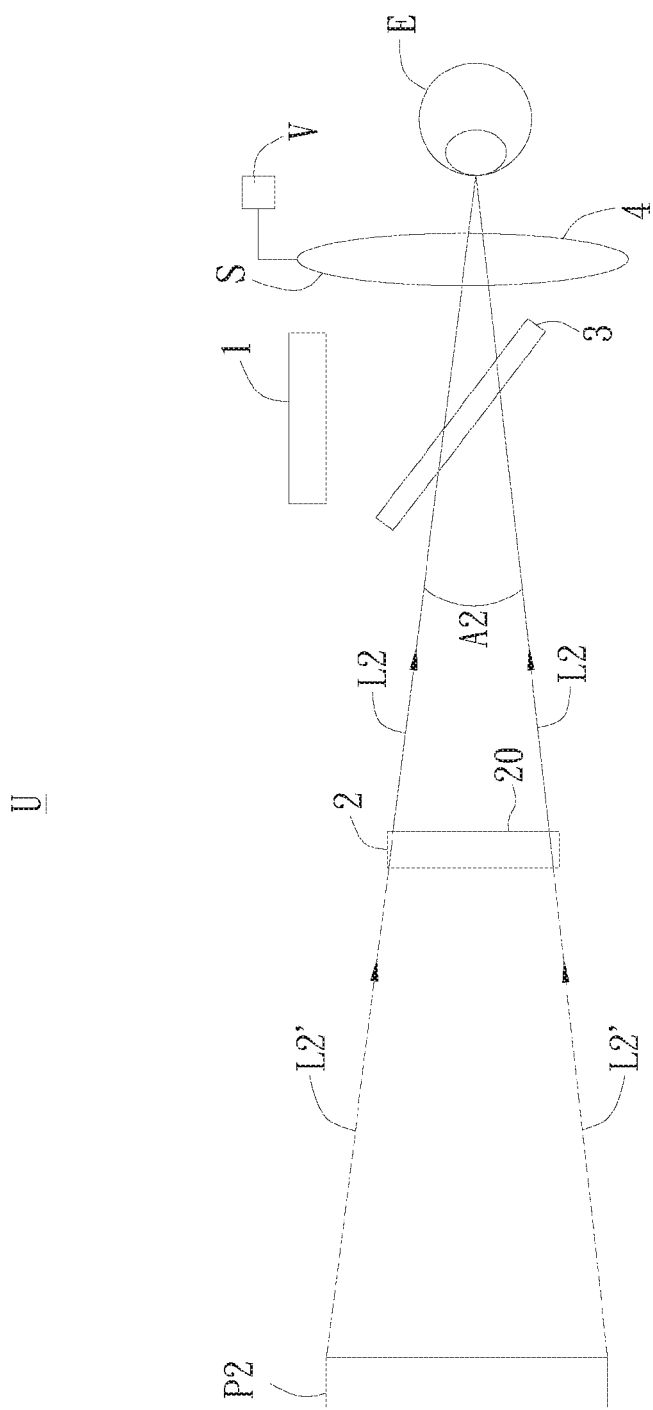
FIG. 9 is a schematic diagram of a visual path generated by the user after the second image light generated by the second display device is processed by the bifocal lens at the second time sequence according to Embodiment 2 of the present invention.

Referring to FIG. 8 and FIG. 9, Embodiment 2 of the present invention provides a display U. For a part in which the display U in this embodiment have same structures and element functions as the display U in Embodiment 1, these details are not described herein again. A largest difference between Embodiment 2 and Embodiment 1 lies in that the bifocal lens 4 in Embodiment 1 is the liquid crystal lens with a fixed radius of curvature, and provides the first focal length f1 and the second focal length f2 by using the feature of dual refractive indexes of the liquid crystal molecules; and in this embodiment, the bifocal lens 4 is a lens with variable curvature, the bifocal lens 4 has a curved surface S, the curved surface S has first curvature at the first time sequence, and has second curvature which is different from the first curvature at the second time sequence, the first image light L1 reaches the curved surface S at the first time sequence, and the second image light L2 reaches the curved surface S at the second time sequence.

Further, the bifocal lens 4 in this embodiment may be made from a piezoelectric material, and the bifocal lens 4 accepts an external voltage V through a line. However, the present invention is not limited thereto. In other embodiments, the bifocal lens 4 may alternatively be made from materials allowing the bifocal lens 4 to change curvature according to requirements of different refractive indexes.

Specifically, FIG. 8 shows that first image light L1 generated by the first display device 1 passes through the bifocal lens 4 at the first time sequence and enters eyes E of a user, and because the user considers that light travels approximately along a straight line, the user will see the first magnification imaging P1 formed by the virtual first image light L1'. FIG. 9 shows that second image light L2 generated by the second display device 2 passes through the bifocal lens 4 at the second time sequence and enters the eyes E of the user. Similarly, the user extends the second image light L2 and sees the second magnification imaging P2 formed by virtual second image light L2'. In this embodiment, the bifocal lens 4 presents different refractive indexes at different time sequences, and the first image light L1 of the first display device 1 and the second image light L2 of the second display device 2 pass through the bifocal lens 4 at the different time sequences, to achieve the effect that an FOV of one of imaging ranges is greater than that of the other imaging range. Those of which has smaller imaging range A2, has higher angle resolution, and better image quality. Those of which has larger imaging range, has larger FOV A1, and more image background details, to provide a better sense of immersion for the user.

In conclusion, by using the foregoing technical means, according to the display provided in the present invention, the technical solutions, namely, "the half mirror has a first surface and a second surface opposite to each other, and is spaced apart from the first display device and the second display device by a first distance and a second distance respectively, where the first distance is not equal to the second distance, the first image light is emitted to the first surface, and the second image light is emitted to the second surface" and "the bifocal lens faces the first surface and is spaced apart from the first surface by a third distance, where the bifocal lens has a first focal length and a second focal length different from each other, the first focal length is greater than a sum of the first distance and the third distance, and the second focal length is greater than a sum of the second distance and the third distance" are used, so that "the first image light reaches the bifocal lens after being reflected on the first surface, and generates first magnification imaging according to the first focal length; the second image light reaches the bifocal lens after passing through the second surface, and generates second magnification imaging according to the second focal length; and a range of the first magnification imaging is not equal to a range of the second magnification imaging".

In this way, the display in the present invention can provide two pieces of imaging with different FOVs. Imaging of smaller FOV can provide a clear image within the watching range of the user, and imaging of a larger FOV can increase background details of the image within the entire visual range of the user. Therefore, as a whole, the display in the present invention can resolve a problem in the existing technology that both of image quality and the sense of immersion cannot be ensured, to improve both the image quality and user experience.

The disclosed content is merely preferred and feasible embodiments of the present invention, and claims of the present invention are not limited by them. Therefore, all of equivalent technical changes made by using the specification and drawing content of the present invention shall fall within the claims of the present invention.

| Description of numerals | | | |
|---|---|---|---|
| Display | U | | |
| First display device | 1 | Display surface of the first display device | 10 |
| | | First image light | L1 |
| | | Virtual first image light | L1' |
| | | Central point of the first display device | M1 |
| Second display device | 2 | Display surface of the second display device | 20 |
| | | Second image light | L2 |
| | | Virtual second image light | L2' |
| | | Central point of the second display device | M2 |
| Half mirror | 3 | First surface | 301 |
| | | Second surface | 302 |
| Bifocal lens | 4 | First focal length | f1 |
| | | Second focal length | f2 |
| | | Liquid crystal molecule | C |
| | | Curved surface | S |
| First magnification imaging | P1 | First FOV | A1 |
| Second magnification imaging | P2 | Second FOV | A2 |
| Overlapped region | R | | |
| First distance | D1 | | |
| Second distance | D2 | | |
| Third distance | D3 | | |
| Eyes of the user | E | | |
| Object images | I1 and I2 | | |
| External voltage | V | | |

What is claimed is:

1. A display, comprising:
   a first display device, providing a first image light;
   a second display device, providing a second image light;
   a half mirror, having a first surface and a second surface opposite to each other, and spaced apart from the first display device and the second display device by a first distance and a second distance respectively, wherein the first distance is not equal to the second distance, the first image light is emitted to the first surface, and the second image light is emitted to the second surface; and
   a bifocal lens, spaced apart from the half mirror by a third distance and opposite to the first surface, wherein the bifocal lens has a first focal length and a second focal length different from each other, the first focal length is greater than a sum of the first distance and the third distance, and the second focal length is greater than a sum of the second distance and the third distance, wherein
   the first image light reaches the bifocal lens after being reflected on the first surface, and generates first magnification imaging according to the first focal length; the second image light reaches the bifocal lens after passing through the second surface, and generates second magnification imaging according to the second focal length; and the range of the first magnification imaging is not equal to the range of the second magnification imaging.

2. The display according to claim 1, wherein the first focal length is less than the second focal length.

3. The display according to claim 2, wherein the first distance is less than the second distance.

4. The display according to claim 1, wherein a display surface of the first display device is perpendicular to a display surface of the second display device, and the half mirror is separately inclined by 45 degrees relative to the display surface of the first display device and the display surface of the second display device.

5. The display according to claim 1, wherein the first image light has a first polarization direction, the second image light has a second polarization direction, the first polarization direction is different from the second polarization direction, and the bifocal lens has different refractive indexes relative to a light in the first polarization direction and a light in the second polarization direction.

6. The display according to claim 5, wherein the bifocal lens comprises a plurality of liquid crystal molecules, a major axis of the liquid crystal molecules is substantially parallel to the first polarization direction, and a minor axis of the liquid crystal molecules is substantially parallel to the second polarization direction.

7. The display according to claim 5, wherein the bifocal lens comprises a plurality of liquid crystal molecules, a minor axis of the liquid crystal molecules is substantially parallel to the first polarization direction, and a major axis of the liquid crystal molecules is substantially parallel to the second polarization direction.

8. The display according to claim 1, wherein the bifocal lens has a curved surface, the curved surface has a first curvature at a first time sequence, and has a second curvature different from the first curvature at a second time sequence; and the first image light reaches the curved surface at the first time sequence, and the second image light reaches the curved surface at the second time sequence.

9. The display according to claim 8, wherein the bifocal lens is made from a piezoelectric material.

10. The display according to claim 1, wherein a range of one of the first magnification imaging and the second magnification imaging is greater than and covers a range of the other one of the first magnification imaging and the second magnification imaging.

11. The display according to claim 10, wherein a partial region where the one that has a larger range and that is of the first magnification imaging and the second magnification imaging overlaps the other one of the first magnification imaging and the second magnification imaging is displayed black.

12. The display according to claim 1, wherein a range of one of the first magnification imaging and the second magnification imaging surrounds a range of the other one of the first magnification imaging and the second magnification imaging.

* * * * *